United States Patent
Lejeune

[15] 3,674,150
[45] July 4, 1972

[54] APPARATUS FOR PREVENTING OFFSHORE OIL WELL POLLUTION

[72] Inventor: Lloyd M. Lejeune, P.O. Box 243, Belle Chasse, La. 70114

[22] Filed: Sept. 25, 1970

[21] Appl. No.: 75,322

[52] U.S. Cl. .................................210/245, 210/DIG. 21
[51] Int. Cl. ........................................................B01d 23/00
[58] Field of Search..................210/83, 242, 523, DIG. 21, 210/244, 245; 61/1; 55/41–46, 171, 177

[56] References Cited

UNITED STATES PATENTS

| | | | |
|---|---|---|---|
| 3,548,605 | 12/1970 | Paull et al. | 61/1 |
| 3,500,841 | 3/1970 | Logan | 210/DIG. 21 |
| 3,339,512 | 9/1967 | Siegel | 210/DIG. 21 |
| 3,572,506 | 3/1971 | Bandy, Jr. et al. | 210/242 |
| 3,389,559 | 6/1968 | Logan | 210/DIG. 21 |

*Primary Examiner*—Reuben Friedman
*Assistant Examiner*—T. A. Granger
*Attorney*—Berman, Davidson and Berman

[57] ABSTRACT

An apparatus for preventing offshore oil well pollution resulting from offshore oil well blowouts or pipe line ruptures. The apparatus includes a sloping cylindrical member having a conical bottom wall open at its upper end. The device is centered over the leak so that the oil passes up into the device through the open top of the conical bottom wall. In the case of a low pressure leak the oil flows down the upper face of the conical wall and is collected in a sump within the apparatus from which it can be pumped. In the case of high pressure blowouts valve plates are provided which can be hydraulically closed to contain the oil spout which then flows into a sump in the apparatus surrounding the conical bottom wall. This sump also may be emptied by pumping. In both instances fire extinguishing gases may be pumped into the device in case ignition of the gas and oil should occur.

9 Claims, 5 Drawing Figures

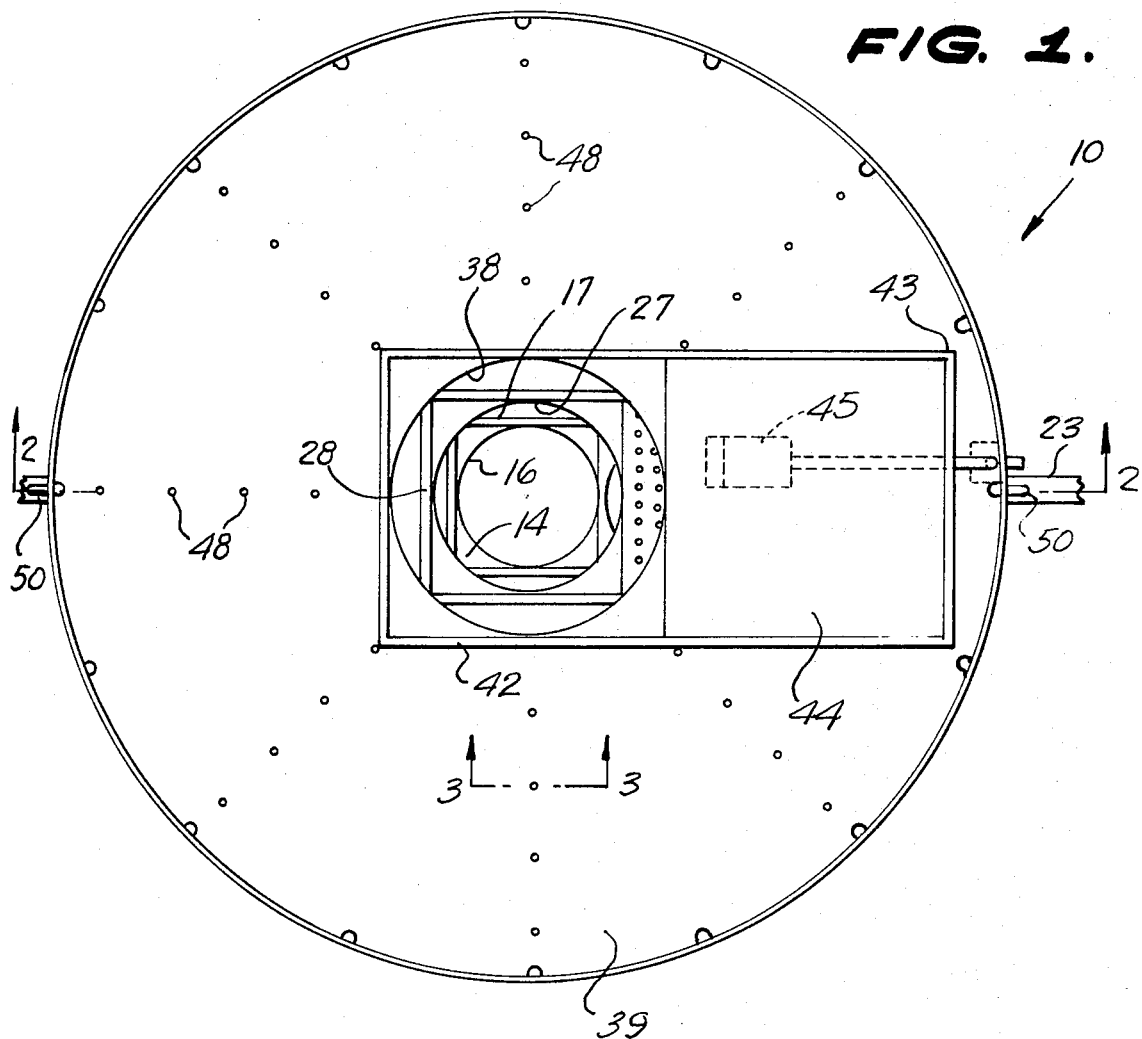
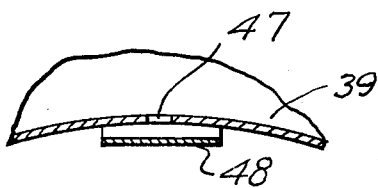
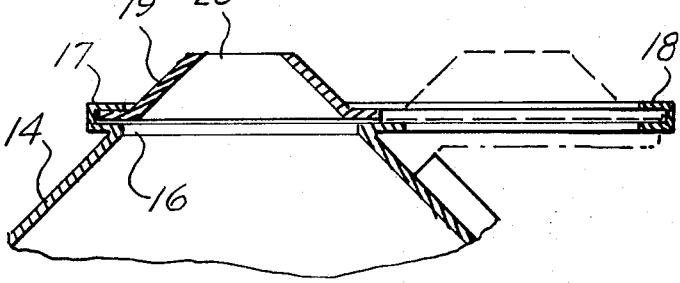

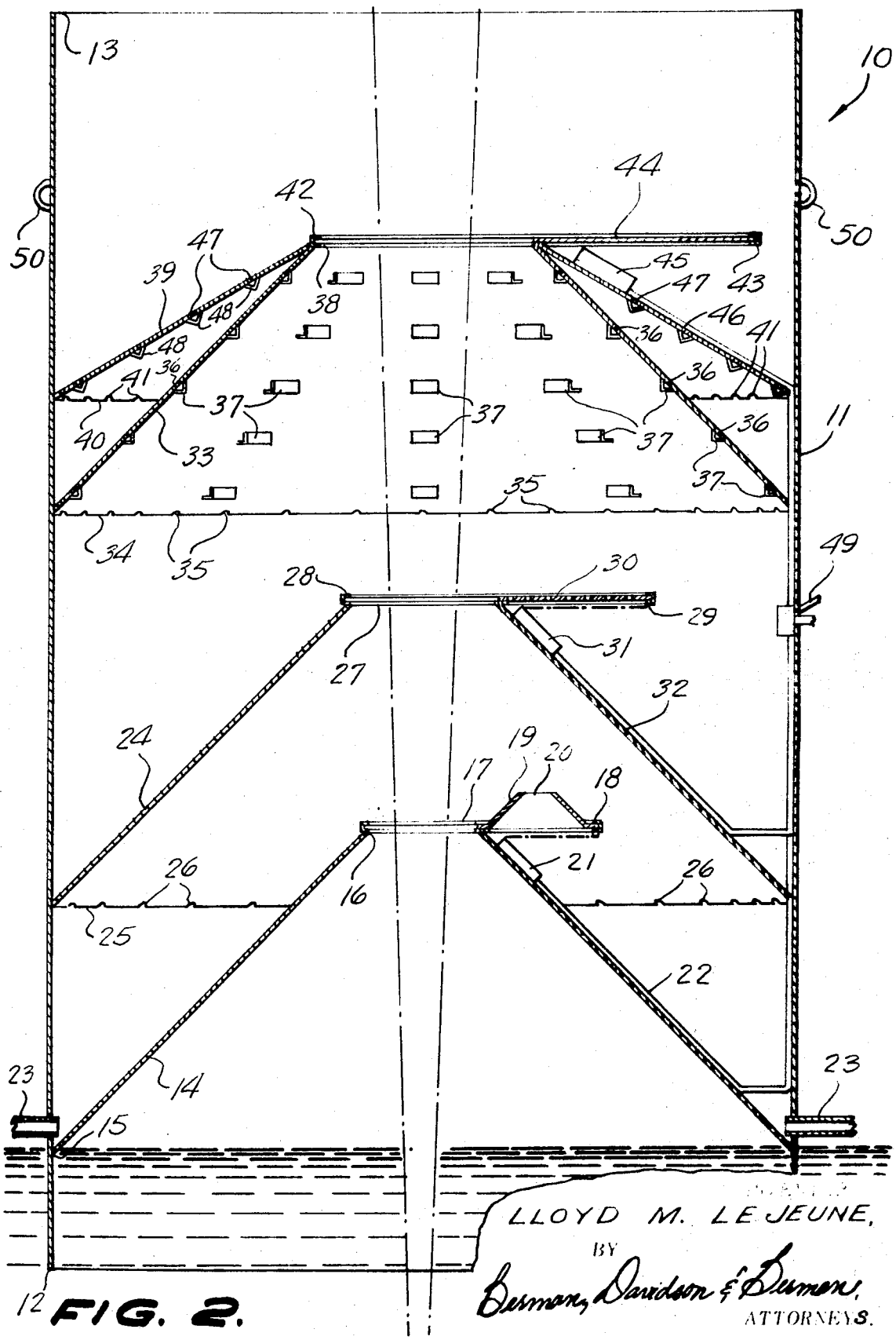

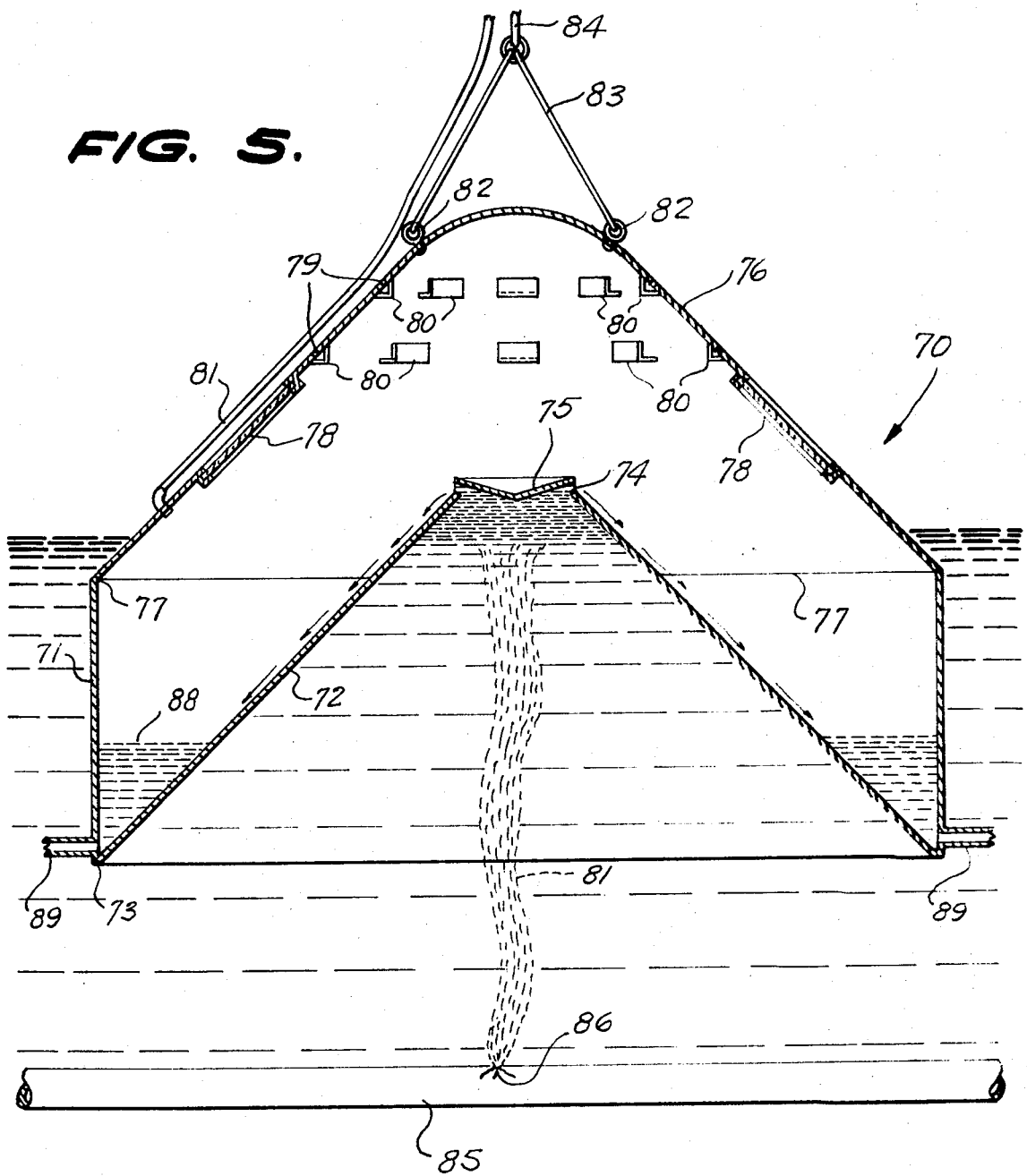

APPARATUS FOR PREVENTING OFFSHORE OIL WELL POLLUTION

BACKGROUND OF THE INVENTION

FIELD OF THE INVENTION

The present invention relates to the prevention of oil pollution resulting from burned out oil wells of the offshore variety and submarine oil line ruptures which release oil into the water.

SUMMARY OF THE INVENTION

The present invention is directed to an apparatus for retaining the oil spout from an offshore oil well blowout so as to prevent pollution of the water. The device includes a conical bottom wall having an opening at the top thereof through which the oil spout flows. A valve is provided for closing over the oil spout. It is retained in the apparatus and the oil is collected in a sump from which it can be pumped to shore or to tanks located on barges. The apparatus has means for permitting the escape of high pressure gases while preventing the escape of oil. Extinguishing gases such as $CO^2$ and nitrogen can be pumped into the device to extinguish fires should this be necessary.

The primary object of the invention is to provide a device which will retain the oil pollution resulting from a burned out oil well or submarine pipe rupture until repairs can be effected to prevent the loss of oil.

Other objects and advantages will become apparent from the following specification when considered in the light of the attached drawings.

BRIEF DESCRIPTION OF THE DRAWINGS

FIG. 1 is a top plan view of the invention;

FIG. 2 is a vertical sectional view taken along the line 2—2 of FIG. 1 looking in the direction of the arrows;

FIG. 3 is an enlarged fragmentary vertical sectional view taken along the line 3—3 of FIG. 1 looking in the direction of the arrows with parts broken away for convenience of illustration;

FIG. 4 is an enlarged fragmentary sectional view of a detail of the invention; and FIG. 5 is a vertical sectional view through a modified form of the invention.

BRIEF DESCRIPTION OF THE PREFERRED EMBODIMENT

Referring now to the drawings in detail wherein like reference characters indicate like parts throughout the several figures, the reference numeral 10 indicates generally an oil pollution retainer constructed in accordance with the invention.

The retainer 10 includes an upright cylindrical wall 11 having an open bottom 12 and an open top 13.

A conical wall 14 is secured to the cylindrical wall 11 circumferentially at 15 spaced above the open bottom 12. The conical wall 14 has a circular opening 16 at the upper end thereof positioned centrally of the cylindrical wall 11. A generally rectangular channel guide 17 is secured to the conical wall 14 around the circular opening 16 and has a portion 18 thereof extending horizontally beyond the opening 16.

A conical choke 19 having a circular opening 20 formed therein is slidably mounted in the guide 17 and can be moved from the portion 18 of the guide 17, as seen in FIG. 2 to the position illustrated in FIG. 4 overlying the circular opening 16 so as to reduce the size of the circular opening 16 to that of the circular opening 20.

A hydraulic ram 21 is secured to the wall 14 and a hydraulic line 22 extends therefrom to a remote control point. The hydraulic ram 21 is connected to the choke 19 and is adapted to move the choke 19 in the guide 17, as described above.

A flexible conduit 23 extends through the cylindrical wall 11 into the space between the cylindrical wall 11 and the conical wall 14 to pump fluids collecting therein to a point of storage.

A conical baffle wall 24 is secured annularly at 25 to the cylindrical wall 11 at a point spaced above the securement 15 of the conical wall 14. A plurality of ports 26 are formed in the lower end of the conical wall 24 adjacent the cylindrical wall 11 to permit oil and other fluids trapped above the conical wall 24 to flow down to the space into which the conduit 23 extends. The conical wall 24 has a circular opening 27 formed therein at the upper edge thereof. The opening 27 is substantially larger than the opening 16 and is surrounded by a generally rectangular guide 28 similar in construction to the guide 17. A portion 29 of the guide 28 extends horizontally outwardly from the circular opening 27 and a valve plate 30 is mounted in the guide 28 for horizontal reciprocation therein. A hydraulic ram 31 is mounted on the conical wall 24 and has a hydraulic line 32 extending to a remote point for control. The hydraulic ram 31 is connected to the valve plate 30 to reciprocate the valve plate 30 and the guide 28 as desired.

A conical wall 33 is secured annularly at 34 to the cylindrical wall 11 at a point spaced well above the securement 25 of the conical wall 24. A plurality of ports 35 are formed in the conical wall 33 adjacent the cylindrical wall 11 to permit fluids trapped thereabove to flow downwardly for eventual removal through the conduit 23.

A plurality of gas vent holes 36 are formed in the conical wall 33 and each has an angle baffle 37 arranged in underlying relation thereto.

A circular opening 38 is formed in the upper part of the conical wall 33 with the opening 38 being substantially larger than the opening 27.

A conical wall 39 is positioned in the apparatus 10 and is secured annularly at 40 to the cylindrical wall 11. A plurality of ports 41 are formed in the lower edge of the conical wall 39 adjacent the cylindrical wall 11 to permit the escape of oil and other fluids trapped thereabove for eventual removal by the conduit 23. The conical wall 39 is somewhat flatter in slope than the conical wall 33 and joins the conical wall 33 at the circular opening 38 which also extends through the conical wall 39. A generally rectangular guide 42 is secured to the conical wall 39 and the conical wall 43 generally surrounding the circular opening 38. The guide 42 has a portion 43 thereof which extends horizontally substantially beyond the circular opening 38. A valve plate 44 is mounted for horizontal reciprocation in the guide 42 and is connected to a hydraulic ram 45 which slides the valve plate 44 as desired. A hydraulic line 46 extends from the hydraulic ram 45 to a remote point for control.

A plurality of gas ports 47 are formed in the conical wall 39 and has an angular baffle 48 underlying each to prevent the flow of oil therethrough.

A conduit 49 extends from a source of high extinguishing gases such as $CO^2$ or nitrogen and is coupled with the cylindrical wall 11 to extinguish fires within the apparatus 10 should this be necessary.

Eyes 50 are secured to the cylindrical wall 11 at spaced points for attaching cables when lowering the apparatus 10 in position for retaining oil pollution.

The valve plate 30 is formed of open work mesh and assists in the breaking up of the force of the oil spout when in position overlying the circular opening 27.

The apparatus 10 is mounted on the flow end of a barge or is carried on a crane with a long boom and is lowered directly over a blowout with the circular openings 16, 27 and 38 completely open. The valve plate 44, screen mesh valve plate 30 and choke 20 are then successively closed to retain the spout within the cylindrical wall 11. The oil and water then bounces off of the undersides of the conical walls 24, 33 and 39 and flows downwardly between the cylindrical wall 11 and the conical wall 14 from where it is pumped through a conduit 23. Gas entrained with the oil and water escapes through the ports 36 and the ports 47 to the atmosphere. In the event that the oil spout is on fire, then $CO^2$ or nitrogen gas is pumped through the conduit 49 to extinguish the fire.

Referring now to FIG. 5, a modified form of the invention is illustrated wherein an oil pollution retainer apparatus is generally indicated at 70.

The apparatus 70 includes a cylindrical wall 71 having a conical wall 72 secured to the lower edge thereof at 73 extending upwardly therein. The conical wall 72 has a circular opening 74 at its upper end kept in spaced apart relation thereto with an inverted conical cap 75.

A closed dome 76 is secured to the cylindrical wall 71 annularly at 77 and extends upwardly therefrom. Observation windows 78 are mounted in the dome 76 so that the interior of the apparatus 70 is visible. A plurality of gas vent holes 79 are formed in the dome 76 with each having an angle baffle 80 associated therewith. The angle baffles 80 are secured to the inner side of the dome 76.

A conduit 81 extends through the dome 80 and leads to a source of fire extinguishing gas such as $CO^2$ or nitrogen.

Lifting eyes 82 are secured to the dome 76 adjacent the top thereof and a lifting yoke 83 connects the eyes 82 to a cable 84 extending from a crane or hoist.

The apparatus 70 is used in conjunction with a submarine oil pipe line 85 which has ruptured at 86 to release oil 87 which goes upwardly therefrom. The conical wall 72 and the cylindrical wall 71 form a sump 88 therebetween to collect the oil 87. Conduits 89 extend from the sump 88 to a point of storage for the oil 87.

In the use and operation of the apparatus 70, it is lifted by a crane or hoist and lowered over the rupture 86 in a pipe line 85 until the oil flowing upwardly therefrom strikes the cap 75 and is deflected through the circular opening 74 where it flows down the inside of the conical wall 72 and is collected in the sump 88. The oil 87 may then be pumped from the sump 88 through the conduits 89 to a point of storage. In the event that the oil 87 becomes ignited within the apparatus 70 fire extinguishing gases such as $CO^2$ and nitrogen are pumped through the conduit 81 to extinguish the flames.

The specific linkages connecting the hydraulic rams 21, 31, and 45, respectively, to the choke 19, valve 30 and valve 44 are conventional and have been indicated by broken lines.

Having thus described the preferred embodiments of the invention, it should be understood that numerous structural modifications and adaptations may be resorted to without departing from the spirit of the invention.

What is claimed is:

1. An oil pollution retaining apparatus comprising an upright cylindrical wall, an open top conical wall having its lower edge integrally secured to the lower edge of said cylindrical wall with the upper edge of said conical wall terminating substantially above the upper edge of said cylindrical wall, said cylindrical wall and said conical wall forming a sump for oil therebetween, wall means overlying said conical wall vertically spaced thereabove and integrally secured to said cylindrical wall for preventing the escape of oil from said apparatus and means forming part of said last-named wall means for permitting the escape of gas from said apparatus.

2. An apparatus as claimed in claim 1, wherein the wall means for retaining oil within said apparatus includes an upper conical wall having its lower edge secured to said cylindrical wall and having an open top, a valve plate, means mounting said valve plate on said upper conical wall for horizontal sliding movement to a position closing the open top of said upper conical wall.

3. An apparatus as claimed in claim 2, wherein a hydraulic ram mounted on said upper conical wall is provided for sliding the valve plate from open position to closed position.

4. A device as claimed in claim 2, wherein baffle means are provided within said apparatus between said lower conical wall and said upper conical wall for dissipating the force of an oil spout.

5. The device as claimed in claim 4, wherein the baffle means for dissipating the force of an oil spout comprises an intermediate conical wall having an open top and a screen valve plate slidably mounted thereon to move to a position overlying said open top.

6. The device as claimed in claim 5, including a hydraulic ram for moving said screen valve plate into a position overlying the opening in said conical wall.

7. An apparatus as claimed in claim 1, wherein the means for preventing the escape of oil from said apparatus includes a dome-shaped top wall having its lower edge integrally secured to the top of said cylindrical wall.

8. An apparatus as claimed in claim 7, wherein observation windows are mounted in said dome-shaped top wall for observing the interior of said apparatus.

9. An apparatus as claimed in claim 7, wherein means are provided on said dome-shaped top wall for lifting said apparatus and supporting said apparatus in operative position.

* * * * *